3,359,098
CONSOLIDATION BY CHEMICAL SINTERING
Earl Q. Teaford, Columbus, Ohio, assignor, by mesne assignments, to Allied Chemical Corporation, New York, N.Y., a corporation of New York
No Drawing. Filed Feb. 17, 1965, Ser. No. 433,475
6 Claims. (Cl. 75—208)

ABSTRACT OF THE DISCLOSURE

A method of sintering loosely packed refractory metal particles by introducing hydrogen gas and tungsten hexafluoride vapor throughout the pores of a loosely packed mass of tungsten maintained in a temperature gradient and depositing tungsten metal substantially uniformly throughout the interstices of the mass.

---

Refractory metals, because of exceptional retention of mechanical and chemical properties at high temperatures, are quite useful. To mention only a few uses and applications wherein the exceptional high-temperature properties of refractory metals, such as tungsten, are particularly advantageous, there are: filaments; rocket nozzles; heat shields; porous filters; linings; process vessels; ion emitters; and the like.

In the past, refractory metal powders and particles have been consolidated into dense cohered shapes by powder metallurgical techniques, usually involving a sintering at high temperatures of pressed masses of refractory particles or powders. In some teachings, the sinterings have been carried forth in special atmospheres, such as nonoxidizing gases and the like. In some instances, these special atmospheres have included halogen atmospheres, and even an atmosphere of tungsten hexachloride and hydrogen gas. In the latter, as illustrated by U.S. Patent 1,226,925, powdered tungsten is hydraulically pressed and heated in an atmosphere of hydrogen until of a strength for easy handling and then further sintered at a high temperature in the tungsten hexachloride and dry hydrogen atmosphere to cause a deposit of tungsten to form in and to permeate the tungsten powder mass while it is sintering. The product is a refractory metal body composed of partially sintered and partially deposited tungsten metal. Disadvantageously, all such consolidation techniques for consolidating refractory metal particles into a unitary shape require relatively high temperatures of about 1000° C. and higher, and generally result in shrinkage or dimensional changes of the pressed metal powder shapes during sintering.

An object of the invention is to consolidate particles of refractory metal into a unitary, rigid, desired shape.

Another object is to consolidate refractory metal particles into a predetermined unitary, rigid shape at temperatures significantly lower than the fusion temperature of the metal.

A further object is to chemically sinter refractory metal particles, packed loosely in a predetermined shape, without significant dimensional changes in the shape during such consolidation.

A still further object is to provide for substantially uniform interstitial deposition of tungsten metal from its vapor phase throughout interstices of a predetermined shape composed of loosely packed refractory metal particles.

An additional object is to provide a chemically sintered body of a plurality of refractory metal particles joined into a predetermined, unitary shape by tungsten metal deposited from the vapor phase within interstices of the shape.

Still an additional object is to produce a chemically sintered refractory metal body of a porosity adapted for infiltration with a conductive and relatively nonrefractory lower-melting metal, such as copper or silver, for providing an infiltrated chemically sintered body which maintains the shape and dimensions of its refractory metal portion as a result of a cooling effect provided by the melting and evaporation of the nonrefractory metal when the infiltrated chemically sintered body is subjected to high heat fluxes.

All the preceding, and numerous other objects, will be apparent to those skilled in the art from the disclosure which follows.

In the process of the invention, a plurality of particles of a refractory metal, e.g., tungsten metal, is packed loosely, e.g., as by a slight vibration thereof, into a mass of predetermined shape defined by a container. When so packed, the mass is maintained throughout at gradient temperatures of about 300° to 700° C. Concurrently introduced hydrogen gas and tungsten hexafluoride vapor enter the portion of the mass of lowest temperature and flow through progressively increasingly higher temperature portions of the mass to exit from that portion of the mass maintained at the highest temperature, with a temperature differential of at least 50° C. between the lowest and highest temperature portion. By the process, tungsten metal is deposited from the vapor phase substantially uniformly throughout interstices of the mass.

By practice of the invention, there is produced a chemically sintered, rigid, refractory metal body comprised of refractory metal particles joined into a unitary predetermined shape by tungsten metal deposited from the vapor phase throughout interstices of the particles. Such a body can be produced in simple, diverse, and complex predetermined shapes. It can be produced with a desired density just slightly higher than the apparent density of the loosely packed particles. It can be produced with higher densities, if desired, and even with densities up to a density that closely approaches its theoretical density; for example, for an all-tungsten body up to as high as 90 percent and higher of the theoretical density of pure tungsten metal. The consolidated body can be produced with a green strength adequate for many end uses directly, and also a green strength sufficient for subsequent handling, machining, impregnating, conventional sintering, hot-pressing, arc-melting, forging, rolling, extruding, gas-pressure bonding, and like metallurgical processing techniques into a dense refractory metal body of well-known utility.

Significantly the product of the chemical sintering process is of an interconnected porous structure that it is especially fitted for vacuum infiltration with lower melting materials to provide an infiltrated chemically sintered body. Such an infiltrated chemically sintered body, for example an all-tungsten chemically sintered body infiltrated under vacuum conditions with a conductive and relatively nonrefractory metal, such as copper or silver, is possessed of an ability to maintain the shape of its all-tungsten portion thereof as a result of a cooling effect provided by the melting and evaporation of the nonrefractory metal when the infiltrated chemically sintered body is subjected to high heat fluxes.

Tungsten metal particles are particularly useful refractory metal particles for chemically sintering by the process, as they provide an all-tungsten metal consolidated body. Particles of other refractory metals, such as molybdenum, tantalum, rhenium, niobium, chromium, and vanadium, also can be chemically sintered by the process, and even particles of non-metallic refractory materials, such as alumina, thoria, magnesia, zirconia, graphite, tungsten carbide, boron carbide, and the like. In general, particles of any refractory metal substantially nonreactive to the hydrogen gas and the tungsten hexafluoride vapor at the conditions employed for the process are useful in the process. Particles may be uniform and/or irregular in size, may be of a smooth and/or a rough surface, and may be solid or hollow, and/or porous in nature. Uniformly sized particles are useful. Particle size also can vary, and also can range widely. Particles as fine as those retained on a —325 mesh screen (U.S. Sieve Series), to particles as large as those passing through a No. 2 and retained on a No. 3 mesh screen, are useful. Particles of even smaller and larger sizes also can be chemically sintered, but generally yield bodies of low green strength unless sufficient tungsten metal is deposited interstitially, with this generally requiring uneconomical and lengthy process times. However, in some special applications and products, for example those requiring a very small pore size, such as ion emitters, the requisite performance specifications may dominate and outweigh the processing economies of the chemically sintering process even with particles as small as 1 micron diameter.

The process is carried forth in a container which defines and circumscribes an enclosed volume conforming to the predetermined shape of the desired consolidated body. A suitable container has at least one inlet and at least one outlet so that gas and vapors can be flowed into, completely through and out of the container. The container should be adapted for the flow of gases and vapors through the container in a manner so as to avoid any substantially "dead-flow" regions in the container's enclosed volume defining the predetermined shape. Where the consolidated body is to be a simple cylindrical rod shape, the container may be a cylinder. For producing rods of various cross section other than cylindrical, tubelike containers of appropriate cross section are used. By employing a container composed of two concentric cylinders, there may be produced an annular body within the volume encompassed between the two cylinders. Containers for even more diverse and complex shapes also are useful. Such containers may comprise two or more component parts and produce shapes, such as conical bodies, concave or convex curved bodies, cored bodies, sheets, and diverse irregular and complex shapes, so long as no "dead-flow" regions are found within the encompassed shapes of the container. For example, a shape of the general form of the human hand can be prepared with an inlet at the wrist portion of such a shaped container and with outlets at the tip portions of the thumb and each finger of such a shaped container.

The container may be fabricated of any of numerous useful materials. The container material may be of nickel, copper, stainless steel, Monel metal, tungsten, Hastelloy, molybdenum, alumina, and the like. Generally, the container is of a material selected with regard to its relative non-reactivity with the hydrogen gas and tungsten hexafluoride vapor at the process conditions employed and with regard to the manner in which the container is removed from the chemically sintered body.

Refractory particles of a desired material and size are poured or otherwise placed within the container to form a loosely packed body of the desired predetermined shape. Usually, the particles when placed in the container are vibrated gently so as to pack uniformly the particles without excessively large voids being present in the predetermined shape. The particles, when free-flowing, may be simply poured and allowed to settle by gravity means into the predetermined shape defined by the container. To prevent the particles from falling or passing out of the container, the container's lower openings usually are filled with materials such as loose packings of copper or nickel turnings, or covered with a screen or mesh and/or other porous material.

In typical practice of the process, the container and its contents are provided with heating means for maintaining the same at a suitable reaction temperature and for maintaining the loosely packed particles therein at the temperature gradient requisite for the process. This means may be a heating mantle, such as variable resistance electrical windings around the container, electrical furnace elements, induction heating means, or like means, to enable an input of differing amounts of heat throughout various transverse portions of the predetermined shape of loosely packed refractory particles. As a general rule, such a heating means is capable of (a) maintaining that portion of the mass of refractory particles into which the hydrogen gas and tungsten hexafluoride vapor first pass at a temperature of from about 300° to 500° C., (b) maintaining the outlet portion or that portion of the mass from which the gas and vapor pass at a temperature of about 500° to 700° C., the temperature differential between the inlet and outlet portion being about 50° to 250° C., and (c) maintaining portions of the mass intermediate the inlet and outlet portions at temperatures intermediate the inlet and outlet portions. The heating means should be such that the temperature gradient on the mass of packed particles is that of gradually increasing temperatures from the inlet portion of the mass through the intermediate portions of the mass to the outlet portion of the mass with such increasing temperature optionally being step-wise, incremental increases in temperature or being gradual and uniform increases in temperature.

Desirably, the hydrogen gas and tungsten hexafluoride vapor feeds are of purities yielding a highly pure tungsten metal deposit. Purities in excess of 99 percent of tungsten metal deposited interstitially may be readily obtained by using distilled tungsten hexafluoride and hydrogen gas diffused through palladium. The quantity of hydrogen gas concurrently introduced along with tungsten hexafluoride vapor preferably is in excess of the stoichiometric equivalent of the tungsten hexafluoride feed and desirably is an excess sufficient to effect a complete reduction of the hexafluoride. The extent of the excess required to effect a complete reduction of the hexafluoride feed to metal tends to be a function of reaction temperatures. A guide for selection of satisfactorily proportioned quantities of reactants is the stoichiometric hydrogen equivalent defined as three moles of hydrogen feed for each mole of tungsten hexafluoride feed. At temperatures of the order of 300° to 700° C., the molar ratio of $H_2$ to $WF_6$ can be from about 0.9 to 30 and higher.

With the packed particles maintained at temperatures within about 300° to 700° C. and at temperature gradient of from 50° to 250° C., hydrogen gas and tungsten hexafluoride vapor are concurrently introduced for that period of time required to deposit a desired amount of tungsten metal interstitially. When first commenced, the total pressure on the system for introduction of the concurrent flow generally is quite lower than after the desired amount of tungsten metal has been deposited interstitially. Thus, it is desirable to progressively increase the pressure on the feed materials introduced into the packed mass of particles as interstitial deposition proceeds so as to facilitate permeation throughout interstices of the particles. It has been found by suitably increasing pressure of the introduced feed material that tungsten metal can be deposited interstitially in loosely packed tungsten particles to provide a chemically sintered tungsten body throughout of a density as high as 90 percent and higher of the theoretical density of pure tungsten metal.

During practice of the process, the container may be in a vertical, horizontal, or diagonal position, as desired. The feed materials are introduced preferably to flow generally in a downward direction through the container and its mass of packed particles, although, if desired, the flow may be upwardly or even diagonally or horizontally so long as the flow proceeds progressively through transverse higher temperature portions of the mass.

Upon interstitial deposition of a desired amount of tungsten metal, the flow of tungsten hexafluoride is discontinued, then the flow of hydrogen discontinued, and shortly thereafter the heating means shut off, permitting the container and its contents to cool. During this cooling period, hydrogen gas or an inert gas, such as argon and helium or the like, may be flowed through the container. Similarly, upon initiation of the process and prior thereto, to purge the container and its mass of packed particles, hydrogen gas or an inert gas may be flowed through the container while bringing it to requisite temperatures for the process. Upon cooling of the container and its contents to ambient temperature or other temperature satisfactory for handling of the same, the container is removed from its contents which now are a chemically sintered shape. The removal of the container may be by conventional mechanical means, such as sawing, cutting, planing, milling, etc., of the container from the chemically sintered body, or, if desired, the container may be stripped by use of appropriate solvents which dissolve the container but do not materially affect the chemically sintered body.

A number of examples now will be set forth to further illustrate the invention.

*Example 1*

The lower end of a vertically positioned, ¾-inch inside-diameter copper cylindrical tube, is covered with a No. 100-mesh copper screen. High-purity tungsten metal particles of an average size of about 420 microns are poured into the upper end of the copper tube to form the loosely packed particles into a column of about ¾-inch diameter, resting on the copper screen. The copper tube is surrounded by two electrically heated furnaces, each about four inches long and each separately controlled and arranged vertically end to end, one above the other, slightly overlapping the ends of that portion of the copper tube containing the loosely packed tungsten particles. Pure dry hydrogen gas is flowed through the copper tube from the top downward while current is adjusted to the electrically heated furnaces so as to provide a temperature gradient throughout the columnar length of packed particles. When the particles reach the desired temperature, tungsten hexafluoride vapor is commingled with the hydrogen gas being introduced into the copper tube at its upper end and the process carried forth under the following conditions:

Column of loosely packed tungsten particles:
  Over-all weight _____ 717 grams.
  Over-all height _____ 7⅞ inches.
  Apparent density _____ 65% of solid tungsten metal.
  Temperature at top _____ 450° C.
  Temperature at middle _____ Intermediate 450°–620° C.
  Temperature at bottom _____ 620° C.
Total reactant feed pressure:
  At start _____ 4.5 inches of water.
  At finish _____ 22.5 inches of water.
Hydrogen flow rate _____ 0.2 ft.³/min.
Hydrogen ratio (⅓ the molar ratio of hydrogen to tungsten hexafluoride) _____ 3.7.
Duration of concurrent feeding of H₂ and WF₆ _____ 25 minutes.

At the termination of the concurrent introduction of hydrogen gas and tungsten hexafluoride vapor, power to the heated furnaces is shut off and hydrogen gas continues to flow through the copper tube until the tube cools to about 30° C. At this time, the copper tube is removed from the furnaces and the copper tube machined away from the body within the tube. The chemically sintered product consists essentially of tungsten metal particles cohered into a rigid columnar mass by tungsten metal deposited interstitially from the vapor phase. The product has an apparent density of about 73 percent of solid tungsten metal and weighs about 817 grams, of which about 12.2 percent by weight is newly deposited tungsten metal. Cross sections are taken at half-inch distances spaced uniformly throughout the length of the columnar product and density determinations of these sections show that the product is of an apparently uniform density throughout its length.

Other columnar shapes of loosely packed tungsten particles are chemically sintered in general accord with the above-described procedure except under the conditions set forth in the following examples:

*Example 2*

Container:
  Material _____ Copper.
  Shape _____ Cylindrical tube.
  I.D. _____ 1¼ in.
  Length _____ 4 in.
Heating means: two furnaces, each 1¾ in. I.D. by 2 in. long, positioned end-to-end, one above the other encircling the container.
Refractory particles:
  Material _____ Tungsten.
  Size _____ −30 to +60 mesh (U.S. Sieve Series.)
Column of loosely packed particles:
  Weight _____ 739 gms.
  Height _____ 3 in.
  Diameter _____ 1¼ in.
  Density _____ 62% of solid W metal.
  At top _____ 500° C.
  At middle _____ About 550° C.
  At bottom _____ 600° C.
Container position _____ Vertical.
Flow direction _____ Downward.
H₂ flow rate _____ 0.2 ft.³/min.
Hydrogen ratio _____ 0.94
Duration of concurrent feeding of H₂ and WF₆ _____ 50 min.
Total reactant feed pressure:
  At start _____ 1.7 in./H₂O.
  At finish _____ 28.3 in./H₂O.
Conversion of WF₆ to W _____ 38.3%.
Product:
  Weight _____ 1057 gms.
  Length _____ 3 1/16 in.
  Diameter _____ 1¼ in.
  Newly deposited W _____ 30.1%.
  Density _____ 87.4% of solid W metal.

*Example 3*

Example 2 is repeated, except that the flow direction is upward, and the top of the column of loosely packed particles is maintained at temperature of 600° C., the middle at temperature of 550° C., and the bottom at temperature of 480° C. The product is substantially equivalent to that of Example 2.

*Example 4*

Container:
  Material _____ Copper.
  Shape _____ Cylindrical tube.
  I.D. _____ ¾ in.
  Length _____ >8 in.
Heating means: three furnaces, each 3 in. long, positioned end-to-end, one above the other, encircling the container.
Refractory particles:
  Material _____ tungsten.
  Size _____ 450 microns.
Column of loosely packed particles:
  Weight _____ 732 gms.
  Height _____ 7¾ in.
  Diameter _____ ¾ in.
  Density _____ 66% of solid W metal.
  At top _____ 400° C.
  At middle _____ 475° C.
  At bottom _____ 600° C.
Container position _____ Vertical.
Flow direction _____ Downward.
H₂ flow rate _____ 0.1 ft.³/min.

Example 4.—Continued

- Hydrogen ratio: 2.18.
- Duration of concurrent feeding of $H_2$ and $WF_6$: 55 min.
- Total reactant feed pressure:
  - At start: 2.0 in./$H_2O$.
  - At finish: 24.5 in./$H_2O$.
- Conversion of $WF_6$ to W: 90.2%.
- Product:
  - Weight: 908 gms.
  - Length: 7¾ in.
  - Diameter: ¾ in.
  - Newly deposited W: 19.4%.
  - Density: 82% of solid W metal.

Example 5

- Container:
  - Material: Copper.
  - Shape: Cylindrical tube.
  - I.D.: ¾ in.
  - Length: 10 in.
- Heating means: four furnaces, each 2½ in. long, positioned end-to-end, one above the other encircling the container.
- Refractory particles:
  - Material: Molybdenum.
  - Size: Av. 560 microns (89% was −20 to +50 mesh).
- Column of loosely packed particles:
  - Weight: 311 gms.
  - Height: 7¾ in.
  - Diameter: ¾ in.
  - At top: 575° C.
  - Intermediate: 500° C.
  - Intermediate: 425° C.
  - At bottom: 350° C.
- Container position: Vertical.
- Flow direction: Upward.
- $H_2$ flow rate: 0.2 ft.³/min.
- Hydrogen ratio: 5.3.
- Duration of concurrent feeding of $H_2$ and $WF_6$: 50 min.
- Total reactant feed pressure:
  - At start: 2.6 in./$H_2O$.
  - At finish: 20.0 in./$H_2O$.
- Conversion of $WF_6$ to W: 70%.
- Product:
  - Weight: 417 gms.
  - Length: 7¾ in.
  - Diameter: ¾ in.
  - Newly deposited W: 25.4%.

Example 6

- Container:
  - Material: Copper.
  - Shape: Cylindrical tube.
  - I.D.: ¾ in.
  - Length: 8 in.
- Heating means: three furnaces; two, each 4 in. long, positioned end-to-end, one above the other encircling the container; a third, 2½ in. long, positioned concentric the lowest 4 in. long furnace encircling its lowermost end.
- Refractory particles:
  - Material: Tungsten.
  - Size: 400 microns.
- Column of loosely packed particles:
  - Weight: 748 gms.
  - Height: 8 1/16 in.
  - Diameter: ¾ in.
  - Density: 65% of solid W metal.
  - At top: 400° C.
  - At middle: About 500° C.
  - At bottom: 600° C.
- Container position: Vertical.
- Flow direction: Downward.

Example 6.—Continued

- $H_2$ flow rate: 0.1 ft.³/min.
- Hydrogen ratio: 1.8.
- Duration of concurrent feeding of $H_2$ and $WF_6$: 45 min.
- Total reactant feed pressure:
  - At start: 2.0 in./$H_2O$.
  - At finish: 23.0 in./$H_2O$.
- Conversion of $WF_6$ to W: 70%.
- Product:
  - Weight: 888 gms.
  - Length: 8 1/16 in.
  - Diameter: ¾ in.
  - Newly deposited W: 15.8%.
  - Density: 77.5% of solid W metal.

Example 7

- Container:
  - Material: Nickel.
  - Shape: Cylindrical tube.
  - I.D.: ⅜ in.
  - Length: 10 in.
- Heating means: three furnaces; two, each 4 in. long, positioned end-to-end, one above the other encircling the container; a third, 2½ in. long, positioned concentric the lowest 4 in. long furnace encircling its lowermost end.
- Refractory particles:
  - Material: Tungsten.
  - Size: 200 microns.
- Column of loosely packed particles:
  - Weight: 334 gms.
  - Height: 8 in.
  - Diameter: ⅜ in.
  - Density: 67% of solid W.
  - At top: 400° C.
  - At middle: About 500° C.
  - At bottom: 600° C.
- Container position: Vertical.
- Flow direction: Downward.
- $H_2$ flow rate: 0.1 ft.³/min.
- Hydrogen ratio: 1.75.
- Duration of concurrent feeding of $H_2$ and $WF_6$: 45 min.
- Total reactant feed pressure:
  - At start: 5.5 in./$H_2O$.
  - At finish: 25.0 in./$H_2O$.
- Conversion of $WF_6$ to W: 37%.
- Product:
  - Weight: 408 gms.
  - Length: 8 in.
  - Diameter: ⅜ in.
  - Newly deposited W: 18.1%.
  - Density: 82% of solid W.

Example 8

- Container:
  - Material: Copper.
  - Shape: Cylindrical tube.
  - I.D.: ¾ in.
  - Length: 8 in.
- Heating means: four furnaces; three, each 3 in. long, positioned end-to-end, one above the other encircling the container, a fourth, ½ in. long, positioned concentric the lowest 3 in. long furnace encircling its lowermost end.
- Refractory particles:
  - Material: Tungsten.
  - Size: 300.
- Column of loosely packed particles:
  - Weight: 772 gms.
  - Height: 8 in.
  - Diameter: ¾ in.
  - Density: 67% of solid W.
  - At top: 375° C.
  - At middle: 450° C.

Example 8.—Continued

| | |
|---|---|
| At bottom | 600° C. |
| Container position | Vertical. |
| Flow direction | Downward. |
| $H_2$ flow rate | 0.1 ft.³/min. |
| Hydrogen ratio | 1.28. |
| Duration of concurrent feeding of $H_2$ and $WF_6$ | 30 min. |
| Total reactant feed pressure: | |
| At start | 2.0 in./$H_2O$. |
| At finish | 24.5 in./$H_2O$. |
| Conversion of $WF_6$ to W | 70.3%. |
| Product: | |
| Weight | 900 gms. |
| Length | 8 in. |
| Diameter | ¾ in. |
| Newly deposited W | 14.2%. |
| Density | 79% of solid W. |

Example 9

When molybdenum, rhenium or tungsten alloy particles replace the particles of the refractory material in any of the preceding examples and the process is carried forth, there is produced a chemically sintered, rigid, refractory body comprised of these particles joined into a unitary predetermined shape by tungsten metal deposited throughout interstices of the particles.

Example 10

A chemically sintered porous rod, about 1 inch diameter by 1¼ inches long and weighing about 17.9 grams, is prepared in accordance with the procedure of the preceding examples. This porous rod has an apparent density of about 90 to 93 percent of the theoretical density of tungsten and is comprised of tungsten metal particles joined into the rod by tungsten metal deposited from the vapor phase interstitially.

This rod is placed in an alumina crucible within a vacuum apparatus and, after pulling of a vacuum in the order of $10^{-9}$ mm. of mercury pressure within the apparatus, is brought to about 1200° C. by an induction heating coil encircling the apparatus. After the rod is maintained at 1200° C. under vacuum for one hour, a small sheet of electrolytic copper metal, hanging within the apparatus directly above the crucible containing the porous rod, is heated by means of an induction heating coil encircling the apparatus. Heat supplied to the copper sheet is sufficient to melt the copper which drops into the crucible where the molten copper infiltrates into the porous rod and eventually fills and overflows the crucible. The crucible and molten copper and tungsten rod are maintained at about 1100° C. for one hour, and then permitted to cool under the vacuum. The crucible and its contents are removed from the apparatus, the crucible removed, and then excess copper machined from the tungsten rod which is thoroughly infiltrated with copper.

Example 11

A chemically sintered porous bar of tungsten about 1 inch diameter by 1½ inches long and weighing about 253 grams is prepared in accordance with the procedure of the preceding examples. The bar is then sintered at about 2575° C. for 1 to 2 hours. The apparent density of the porous bar is about 70 percent of the theoretical density of tungsten.

By an impregnation procedure substantially the same as that of Example 10, copper is infiltrated under vacuum into the porous tungsten bar. After machining excess copper from the surfaces of the bar, the weight of the copper infiltrated tungsten bar product is about 292 grams of which about 39 grams is the copper infiltrated into the pores of the tungsten bar.

Various embodiments, changes, and modifications will be apparent, from the foregoing description and examples, to those skilled in the art. All such embodiments, changes and modifications that fall within the true spirit of the invention are intended to be included with the invention limited only as set forth in the appended claims.

I claim:

1. The process of producing a chemically sintered, rigid body, which process comprises: maintaining a predetermined shape of loosely packed, refractory metal particles at gradient temperatures of about 300° to 700° C., with a temperature differential of at least 50° C. between the lowest and the highest temperature portion and with progressively higher temperatures maintained in said shape in the direction of hydrogen gas and tungsten hexafluoride vapor concurrently flowing through interstices of said predetermined shape.

2. The process of claim 1 employing particles of tungsten metal.

3. The process of producing a chemically sintered, rigid body comprised of individual refractory metal particles joined into a unitary shape by tungsten metal vapor-deposited within interstices of said particles by a process comprising:

(a) loosely packing a plurality of individual refractory particles in a predetermined shape defined by a container having at least one inlet and one outlet;

(b) maintaining a temperature differential of about 50° to 250° C. between particles packed closest to said inlet and particles packed closest to said outlet, with the particles closest to the inlet being maintained at temperature of at least about 300° C. and particles closest to the outlet being maintained at temperature no greater than about 700° C.; and (c) concurrently feeding hydrogen gas and tungsten hexafluoride vapor into said container through said inlet so as to concurrently flow the same through interstices of said loosely packed particles in the direction of from coldest to hottest particles in said shape.

4. The process of claim 3 in which the particles closest to the inlet are maintained at temperature of about 300° to 500° C. and the particles closest to the outlet are maintained at temperature of about 500° to 700° C.

5. The process of claim 3 in which the pressure, under which the hydrogen gas and tungsten hexafluoride vapor is being fed, is progressively increased as the process proceeds.

6. The process of claim 3 employing particles of tungsten metal.

References Cited

UNITED STATES PATENTS

| | | |
|---|---|---|
| 3,072,983 | 1/1963 | Brenner. |
| 3,114,961 | 12/1963 | Chambers et al. 117—107.2 X |
| 3,139,658 | 7/1964 | Brenner 117—107.2 X |
| 3,157,532 | 11/1964 | Galmiche 117—107.2 X |
| 3,160,517 | 12/1964 | Jenkin 117—107.2 X |
| 3,185,566 | 5/1965 | Galmiche 75—212 |
| 3,318,724 | 9/1967 | Heestand 117—107.2 XR |

OTHER REFERENCES

CHEMICAL ENGINEERING; June 12, 1961, vol. 68, No. 12, "Vapor-Phase Process Deposits Impervious Coatings of Tungsten."

L. DEWAYNE RUTLEDGE, *Primary Examiner.*

BENJAMIN R. PADGETT, *Examiner.*

A. J. STEINER, *Assistant Examiner.*